US009054567B2

(12) United States Patent
Ramu

(10) Patent No.: US 9,054,567 B2
(45) Date of Patent: Jun. 9, 2015

(54) HIGH POWER DENSITY SRMS

(75) Inventor: Krishnan Ramu, Blacksburg, VA (US)

(73) Assignee: Regal Beloit America, Inc., Beloit, WI (US)

( * ) Notice: Subject to any disclaimer, the term of this patent is extended or adjusted under 35 U.S.C. 154(b) by 598 days.

(21) Appl. No.: 13/287,207

(22) Filed: Nov. 2, 2011

(65) Prior Publication Data
US 2012/0104988 A1 May 3, 2012

Related U.S. Application Data

(60) Provisional application No. 61/409,638, filed on Nov. 3, 2010.

(51) Int. Cl.
H02P 6/00 (2006.01)
H02K 1/24 (2006.01)
H02K 15/12 (2006.01)

(52) U.S. Cl.
CPC H02K 1/24 (2013.01); H02K 15/12 (2013.01); Y02T 10/641 (2013.01)

(58) Field of Classification Search
USPC .................. 318/701, 400.01, 400.26, 400.3
See application file for complete search history.

(56) References Cited

U.S. PATENT DOCUMENTS

| 4,217,511 | A | | 8/1980 | King, Jr. et al. |
| 4,475,051 | A | | 10/1984 | Chai et al. |
| 4,500,824 | A | * | 2/1985 | Miller .......................... 318/701 |
| 4,684,867 | A | * | 8/1987 | Miller et al. .................. 318/701 |
| 4,725,751 | A | | 2/1988 | Bassler et al. |
| 4,743,825 | A | | 5/1988 | Nashiki |
| 4,990,809 | A | | 2/1991 | Artus et al. |
| 5,005,281 | A | | 4/1991 | Burns |
| 5,015,903 | A | | 5/1991 | Hancock et al. |
| 5,053,666 | A | | 10/1991 | Kliman et al. |
| 5,250,867 | A | | 10/1993 | Gizaw |
| 5,563,487 | A | * | 10/1996 | Davis ............................ 318/701 |

(Continued)

FOREIGN PATENT DOCUMENTS

CH 0153588 A 3/1932
DE 10229333 1/2004

(Continued)

OTHER PUBLICATIONS

International Preliminary Report on Patentability issued in International PCT Application No. PCT/US2011/058539 mailed on Mar. 6, 2014.

(Continued)

*Primary Examiner* — Rina Duda
(74) *Attorney, Agent, or Firm* — Armstrong Teasdale LLP

(57) ABSTRACT

A power converter having a first switch and a first unidirectional current device that conducts current unidirectionally. The first switch and first unidirectional current device are interconnected such that when interconnected with a dc voltage supply, battery, and first phase winding of an electrical machine: (1) a first operational state exists in which a conductive state of the first switch causes the dc voltage supply to conduct current through the first switch and first phase winding, so as to store energy within the first phase winding and (2) a second operational state exists in which a non-conductive state of the first switch causes the first phase winding to discharge its stored energy by conducting current through the first unidirectional current device and battery, so as to store energy in the battery.

22 Claims, 6 Drawing Sheets

(56) References Cited

U.S. PATENT DOCUMENTS

| | | | |
|---|---|---|---|
| 5,604,388 A | 2/1997 | Baker et al. | |
| 5,739,615 A | 4/1998 | McClelland | |
| 5,838,087 A | 11/1998 | Tang | |
| 5,864,477 A | 1/1999 | Webster | |
| 5,909,071 A | 6/1999 | Sakuma et al. | |
| 6,037,740 A | 3/2000 | Pollock et al. | |
| 6,043,574 A | 3/2000 | Prudham | |
| 6,091,168 A | 7/2000 | Halsey et al. | |
| 6,201,368 B1 * | 3/2001 | Webster | 318/729 |
| 6,483,210 B1 | 11/2002 | Soderberg | |
| 6,628,105 B1 * | 9/2003 | Tankard | 322/94 |
| 6,720,686 B1 | 4/2004 | Horst | |
| 6,849,985 B2 | 2/2005 | Jack et al. | |
| 6,867,561 B1 * | 3/2005 | Pollock et al. | 318/400.2 |
| 6,988,689 B2 | 1/2006 | Thomas et al. | |
| 7,271,564 B2 * | 9/2007 | Ramu | 318/254.1 |
| 7,372,232 B2 * | 5/2008 | Ramu | 318/700 |
| 7,468,570 B2 | 12/2008 | Ionel et al. | |
| 7,528,516 B2 | 5/2009 | Mipo et al. | |
| 7,732,967 B2 | 6/2010 | Vollmer et al. | |
| 8,004,141 B2 | 8/2011 | Jeung | |
| 8,089,192 B2 | 1/2012 | Li et al. | |
| 8,102,093 B2 | 1/2012 | Prudham | |
| 8,754,605 B2 | 6/2014 | Ramu | |
| 2004/0008003 A1 | 1/2004 | Turner | |
| 2004/0021395 A1 | 2/2004 | Maslov et al. | |
| 2004/0085040 A1 | 5/2004 | Chen | |
| 2005/0156475 A1 | 7/2005 | Ramu et al. | |
| 2006/0232069 A1 | 10/2006 | Lim et al. | |
| 2006/0273680 A1 | 12/2006 | Ramu et al. | |
| 2007/0008744 A1 | 1/2007 | Heo et al. | |
| 2007/0182383 A1 | 8/2007 | Park et al. | |
| 2007/0273322 A1 | 11/2007 | Ramu | |
| 2008/0030092 A1 | 2/2008 | Rolando Avila Cusicanqui | |
| 2008/0246362 A1 | 10/2008 | Hirzel | |
| 2009/0045768 A1 | 2/2009 | Ramu | |
| 2010/0060223 A1 | 3/2010 | Sakai et al. | |
| 2010/0141061 A1 | 6/2010 | Ramu et al. | |
| 2010/0181858 A1 | 7/2010 | Hibbs et al. | |

FOREIGN PATENT DOCUMENTS

| | | |
|---|---|---|
| FR | 317609 | 9/1902 |
| FR | 856500 | 6/1940 |
| JP | 47-42256 | 12/1972 |
| JP | 51-125804 | 2/1976 |
| JP | 5594548 | 7/1980 |
| JP | 58165640 | 9/1983 |
| JP | 6469239 | 3/1989 |
| WO | 2009023205 A1 | 2/2009 |
| WO | 2012061271 A2 | 5/2012 |
| WO | 2012061273 A2 | 5/2012 |
| WO | 2012061456 A1 | 5/2012 |
| WO | 2012061458 A1 | 5/2012 |

OTHER PUBLICATIONS

International Search Report and Written Opinion issued in International PCT Application No. PCT/US2011/058539 mailed on Feb. 1, 2013.

International Search Report and Written Opinion issued in International PCT Application No. PCT/US2011/058887 mailed on Mar. 7, 2012.

International Search Report and Written Opinion issued in International PCT Application No. PCT/US2011/058890 mailed on Mar. 7, 2012.

International Preliminary Report on Patentability, issued in International PCT Application No. PCT/US2011/058536 mailed on May 27 2014.

International Search Report and Written Opinion issued in International PCT Application No. PCT/US2011/058536 mailed on May 15, 2014.

* cited by examiner

HIGH POWER DENSITY SRMS

This application claims priority to U.S. provisional application 61/409,638, filed on Nov. 3, 2010, the content of which is incorporated herein by reference.

BACKGROUND OF THE RELATED ART

Low cost motor drives in vehicle applications such as electric bikes (hereafter referred to as E-Bikes), operated with battery-stored energy, are sought after because of their positive impact on the environment, the existing mass market of electric bikes, and the limited financial resources of the user community in countries such as China, India, and other developing nations. One of the significant cost elements in a motor drive is the power converter circuit, particularly in the number of power devices such as transistors and power diodes. Economy in the use of power devices translates into reduced control circuit components, such as gate drives, logic power supplies, and device protection circuits; such economy also leads to reduced printed circuit board area, heat-sink volume, and weight. Fewer power devices also leads to lower cost of the power electronic system for the motor drive.

SUMMARY OF THE INVENTION

The invention disclosed herein provides a low-cost power electronic circuit for vehicle applications, including E-Bikes. The circuit has a small number of power devices and operates from energy stored in a battery. Batteries may be connected in series, in parallel, or both in series and in parallel to obtain a certain desired direct-current (dc) voltage, and such an arrangement is designated, herein, as a battery bank. The power electronic circuit with its control for an electric vehicle (EV) application, hereafter referred to as an EV drive, may: (1) charge a battery from a utility grid; (2) draw motoring power from a battery bank; and (3) recharge a battery bank during regeneration of the machine.

As applied to a switched reluctance machine (SRM) or a permanent magnet brushless dc machine (PMBDCM), the disclosed power electronic circuit: (1) does not require a separate power electronic circuit to charge a battery; (2) does not require a separate inductor (or choke) in a charger circuit, because windings of the machine smooth the controlled and rectified voltage for charging the batteries; (3) employs a converter having only one switch (i.e., transistor) per phase so as to reduce the overall cost, particularly so when charging and regeneration are included in the converter's functions; and (4) alternatively employs a converter having two switches (i.e., transistors) per phase, with the transistors packaged as a single-phase inverter leg, so as to obtain a compact and highly efficient package.

These and other objects of the invention may be achieved, in whole or in part, by a power converter having a first switch and a first unidirectional current device that conducts current unidirectionally. The first switch and first unidirectional current device are interconnected such that when interconnected with a dc voltage supply, battery, and first phase winding of an electrical machine: (1) a first operational state exists in which a conductive state of the first switch causes the dc voltage supply to conduct current through the first switch and first phase winding, so as to store energy within the first phase winding, and (2) a second operational state exists in which a non-conductive state of the first switch causes the first phase winding to discharge its stored energy by conducting current through the first unidirectional current device and battery, so as to store energy in the battery.

Additionally, the objects of the invention may be achieved, in whole or in part, by a power converter having: (1) a first capacitor with first and second electrical terminals, (2) a first switch that conducts current unidirectionally between first and second electrical terminals when the first switch is activated and does not conduct current between the first and second terminals when deactivated, (3) a first unidirectional current device that conducts current unidirectionally between first and second electrical terminals, (4) a first phase winding of an electrical machine; and (5) a battery with first and second electrical, terminals. The first terminal of the first capacitor is directly connected to the first terminal of the first switch. The second terminal of the first switch is directly connected to the second terminal of the first unidirectional current device and the first terminal of the first phase winding. The second terminal of the first phase winding is directly connected to the first terminal of the battery, and the second terminal of the first capacitor is directly connected to the first terminal of the first unidirectional device and the second terminal of the battery.

Still further, the objects of the invention may be achieved, in whole or in part, by a power converter having: (1) a first capacitor with first and second electrical terminals, (2) first and second switches that each conducts current unidirectionally between first and second electrical terminals when the switch is activated and does not conduct current between the first and second terminals when deactivated, (3) first and second unidirectional current devices that each conducts current unidirectionally between first and second electrical terminals, (4) a first phase winding of an electrical machine, and (5) a battery with first and second electrical terminals. The first terminal of the first capacitor is directly connected to the first terminal of the first switch and the second terminal of the first unidirectional current device. The second terminal of the first switch is directly connected to the second terminal of the second unidirectional current device and the first terminals of the first phase winding, second switch, and first unidirectional current device. The second terminal of the second switch is directly connected to the first terminals of the second unidirectional current device and battery. The second terminal of the first capacitor is directly connected to the second terminals of the first phase winding and the battery.

Still further, the objects of the invention may be achieved, in whole or in part, by a power converter having first and second switches and first and second unidirectional current devices that each conducts current unidirectionally. The first and second switches and first and second unidirectional current devices are interconnected such that when interconnected with a dc voltage supply, battery, and first phase winding of an electrical machine: (1) a first operational state exists in which a conductive state of the first switch causes the dc voltage supply to conduct current through the first phase winding, so as to store energy within the first phase winding, (2) a second operational state exists in which a non-conductive state of the first switch causes the first phase winding to discharge its stored energy by conducting current through the second unidirectional current device and the battery, so as to store energy in the battery, (3) a third operational state exists in which a conductive state of the second switch causes the battery to conduct current through the first phase winding, so as to store energy within the first phase winding, and (4) a fourth operational state exists in which a non-conductive state of the second switch causes the first phase winding to discharge its stored energy by conducting current through the first unidirectional current device and the dc voltage supply, so as to store energy in the dc voltage supply.

Still further, the objects of the invention may be achieved, in whole or in part, by a power converter having a first switch and a first unidirectional current device that conducts current unidirectionally. The first switch and first unidirectional current device are interconnected such that when interconnected with a dc voltage supply, battery, and first phase winding of an electrical machine: (1) a first operational state exists in which a conductive state of the first switch causes the battery to conduct current through the first switch and first phase winding, so as to store energy within the first phase winding, and (2) a second operational state exists in which a non-conductive state of the first switch causes the first phase winding to discharge its stored energy by conducting current through the first unidirectional current device and the dc voltage supply, so as to store energy in the dc voltage supply.

Still further, the objects of the invention may be achieved, in whole or in part, by a brushless motor system having a battery and a brushless motor with first and second phase windings. The phase winding and battery are interconnected such that when interconnected with a dc voltage supply, a first operational state exists in which energy stored by the first phase winding is discharged by conducting current through the battery, thereby storing energy in the battery.

BRIEF DESCRIPTION OF THE DRAWINGS

Preferred embodiments of the invention are described in the following paragraphs of the specification and may be better understood when read in conjunction with the attached drawings, in which.

DETAILED DESCRIPTION OF THE INVENTION

Figure 1:
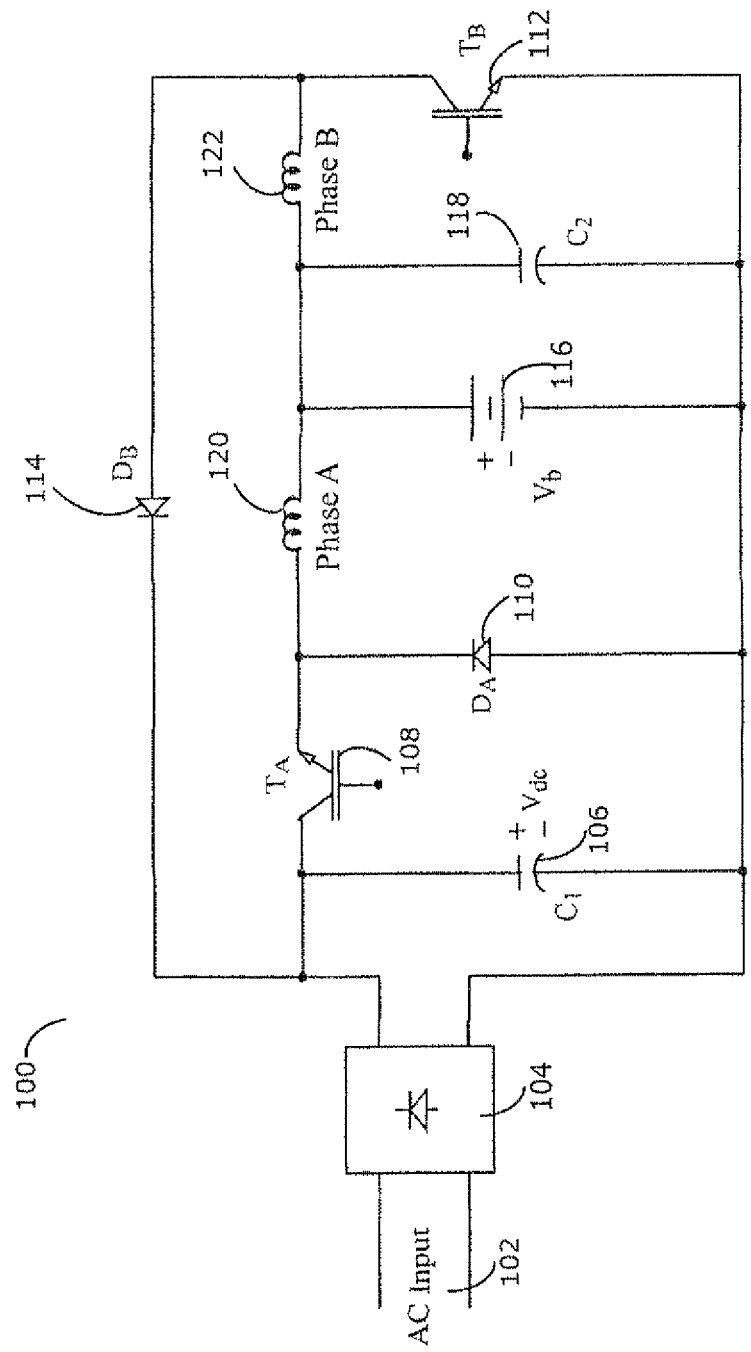
FIG. 1 illustrates a first embodiment of a power converter defined by the invention.

FIG. 1 illustrates a first embodiment of a power converter defined by the invention. Power converter 100 has a single-phase alternating current (ac) supply voltage 102 provided by a utility grid. Supply voltage 102 is rectified through a single-phase bridge rectifier 104 and filtered with a capacitor $C_1$ 106. The direct current (dc) voltage across capacitor 106 is designated as $V_{dc}$ and is also referred to as a dc link voltage. Power converter 100 provides operational modes of battery-bank charging, motoring, and regeneration.

During a charging operation, $V_{dc}$ charges a battery bank 116 via a buck converter, which comprises a transistor $T_A$ 108, freewheeling diode $D_A$ 110, and phase-A machine winding 120 that serves as an inductor. Charging battery bank 116 is accomplished by changing the on-time duration of transistor 108, using pulse width modulation (PWM) control, so that current in phase winding 120 is regulated to be equal to the desired charging current of battery bank 116. Transistor 108 is turned on and off with a duty cycle of d so that current conducted through transistor 108 charges battery bank 116 to a voltage $V_b$ through machine winding 120, which also serves as a voltage-smoothing inductor. Thus, during the charging operation, some energy from capacitor 106 is transferred to battery bank 116 and other such energy is transferred to machine winding 120.

When current conveyed to battery bank 116 exceeds an established amount, transistor 108 is turned off. After transistor 108 is switched off, the energy stored within machine winding 120 will be discharged as a current flowing through phase winding 120, battery bank 116, and diode 110. Thus, battery bank continues to charge for some time after transistor 108 is switched off. The rate of charging battery bank 116 is determined by a reference current command in a feedback-current control loop of a buck power-conversion control system. The duty cycle of transistor 108 is regulated by a current error of the feedback-current control loop, and this current error is the difference between the reference current command and the current conveyed through battery bank 116. The current error is processed by a current controller to regulate the duty cycle of transistor 108.

The current controller may be a proportional-plus integral controller or another type of current controller. The output of the current controller is limited to the safest maximum current that can be handled by the battery during its charging phase.

The magnitude of the reference current determines the rate of charging (i.e., fast, slow, or trickle) and may be established by the controller based on the driving habits of a user, assuming power converter 100 is used for electric vehicle. The output of the current controller is converted into a variable-pulse-width modulated signal by comparing the output with a pulse width modulation carrier-frequency signal, which can be a triangular wave form. As the magnitude of current-controller output increases, the duty cycle d increases. The steady state duty cycle is derived as follows:

$$V_e = dV_{dc} - V_{TA} - R_A I_A \qquad (1)$$

where $V_b$ is the battery voltage, $V_{TA}$ is the conduction-voltage drop of transistor 108, $R_A$ is the resistance of phase winding 120, $I_A$ is the current conveyed through battery bank 116, and d is the duty cycle applied to transistor 108. The duty cycle is given by:

$$d = \frac{V_{TA} + R_A I_A}{V_{dc}}. \qquad (2)$$

During a motoring operation, a transistor $T_B$ 112 is turned on, by a PWM signal applied to its control gate, so that energy stored by battery bank 116 may be discharged through a phase-B machine winding 122. The PWM current control may be similar to the current control in the charging system for battery bank 116, as described above. As transistor 112 is turned off, machine winding 122 discharges its stored energy by conveying a current through diode $D_B$ 114, capacitor 106, and capacitor $C_2$ 118, which results in a transfer of energy from machine winding 122 to capacitor 106. With a PWM signal applied to the control gate of transistor 112, energy is stored within machine winding 122 with each on-period of the PWM duty cycle and this energy is partially transferred to capacitor 106.

The energy transferred from machine winding 122 to capacitor 106 may be used to energize machine winding 120. Thus, capacitor 106 receives energy from a boost circuit comprising battery bank 116, capacitor 118, machine winding 122, transistor 112, diode 114 and capacitor 106.

A regeneration mode of operation exists when a negative slope occurs for a machine winding inductance-versus-rotor position characteristic. During the regeneration mode of a phase, the corresponding machine winding may be energized to desired level by switching on its respective transistor switch; thereafter, the transistor is switched off. For example, transistor 108 is switched off for machine winding 120 and transistor 112 is switched off for machine winding 122, so that energy stored in machine winding 120 is conveyed to battery bank 116 and energy stored in machine winding 122 is conveyed to capacitor 106.

Power converter 100 is compact in that it uses a machine-side converter for charging, regeneration, and motoring. Power converter 100 also uses a minimum number of switching devices, as compared to a power converter for a brushless system.

Figure 2:
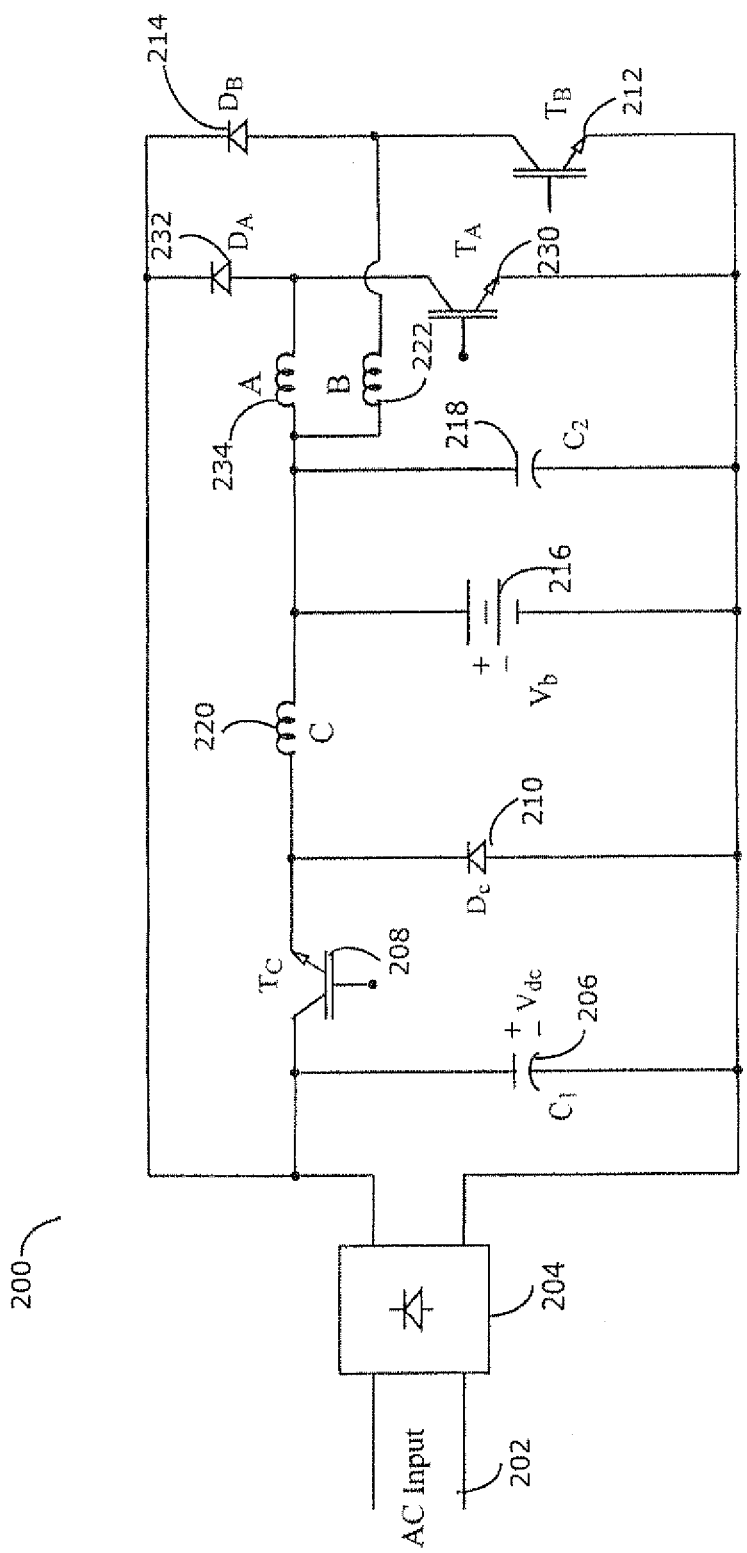
FIG. 2 illustrates a second embodiment of a power converter defined by the invention.

FIG. 2 illustrates a second embodiment of a power converter defined by the invention. Power converter 200 has a buck converter at its front end and two boost converter circuits at its back end, whereas power converter 100 has one buck converter and one boost converter. Thus, power converter 200 is similar to power converter 100 but has an additional boost circuit comprising a machine phase winding, transistor, and freewheeling diode. The machine winding, transistor, and diode of one of the two boost circuits are electrically connected in parallel with such components of the other boost circuit. The operation of each boost circuit is the same as that identified for the boost circuit within power converter 100, illustrated by FIG. 1.

Within power converter 200, front-end charging is done with a buck converter, comprising a transistor 208, a machine winding 220, a freewheeling diode 210, a battery bank 216, capacitor 206, and an ac voltage source 202 that is rectified by a rectifier 204. A first back-end boost converter comprises capacitor 206, battery bank 216, a capacitor 218, a machine winding 234, a transistor 230, and a diode 232. A second back-end boost converter comprises capacitor 206, battery bank 216, capacitor 218, a machine winding 222, a transistor 212, and a diode 214.

The buck circuit used the rectified ac voltage applied across capacitor 206 to charge battery bank 216 with a voltage $V_b$ during a battery charging mode. This battery charging is accomplished by switching transistor 208 on so that capacitor 206 conveys a current through transistor 208, machine winding 220, and battery bank 216.

The first and second boost circuits energize machine windings 234 and 222, respectively, and control regeneration within these machine windings, as well. During regeneration and current commutation, the energy of machine windings 234 and 222 is partly transferred to capacitor 206. Energy stored within capacitor 206 is used for the motoring phase of machine winding 220. Energy recovered from machine windings 234 and 22 is usually sufficient to power machine winding 220 at full-rated condition.

Windings 220, 222, and 234 can be three-phase windings of a three-phase switched reluctance machine (SRM) or windings of a three-phase permanent magnet brushless dc (PMBDC) machine, having a half-wave operation. Alternatively, windings 220, 222, and 234 can be used with a two-phase SRM having a common-pole or back-iron winding; in this instance, machine windings 234 and 222 are phase windings and machine winding 220 is wound around a common-pole (e.g., as used in an E-core machine or an SRM with six stator poles and three rotor poles) or back-iron winding (e.g., of an four stator pole and two rotor pole machine). Common pole windings have the advantage that their currents can be continuous, while those of a distinct phase will have a finite duration of current flow.

Figure 3:
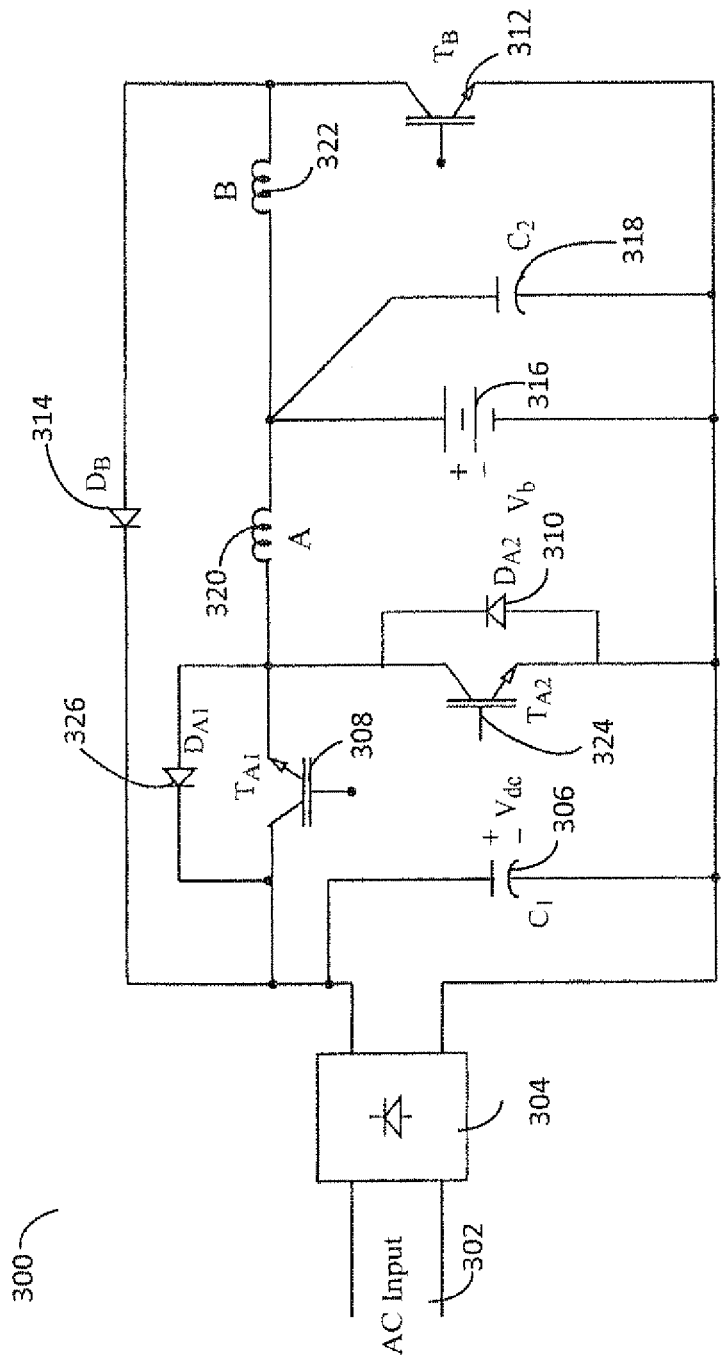
FIG. 3 illustrates a third embodiment of a power converter defined by the invention.

FIG. 3 illustrates a third embodiment of a power converter defined by the invention. A rectifier 304 rectifies the voltage provided by an ac voltage source 302 and applies the rectified voltage across capacitor 306. A battery bank 316 is charged by switching on a transistor 308 so that capacitor 306 conveys a current through transistor 308, a machine winding 320, and battery bank 316. Transistor 308, a free-wheeling diode 326, and machine winding 320 constitute a buck circuit; a description of buck circuit operation is provided above with respect to the buck circuits within power converters 100 and 200.

During a motoring operational mode of a machine winding 322, a transistor 312 is switched on so that battery bank 316 discharges its stored energy by conveying a current through machine winding 322 and transistor 312. Current regulation is achieved by controlling transistor 312 with an appropriate PWM signal. When transistor 312 is turned off, the energy stored in machine winding 322 is discharged by the conduction of current through machine winding 322, a diode 314, capacitor 306, and a capacitor 318; as energy is discharged from machine winding 322, the voltage applied across machine winding 322 is $-(V_{dc}-V_b)$. With $V_{dc}$ greater than $V_b$, the commutation of current can be faster.

Machine winding 320 may be energized via a boost circuit comprising a transistor 324 and battery bank 316. Upon switching on transistor 324, current is conveyed by battery bank 316 through machine winding 320 and transistor 324. When the current conveyed through machine winding 320 exceeds an established limit or the energy stored within machine winding 320 needs to be discharged, transistor 324 is turned off and the stored energy within machine winding 320 is discharged by the conveyance of a current through machine winding 320, diode 326, capacitor 306, and capacitor 318. Energy discharged by machine winding 320 is stored by capacitor 306. As machine winding 320 discharges its stored energy, a voltage $-(V_{dc}-V_b)$ is applied across machine winding 320, which forces the current flowing through machine winding 320 to diminish to zero. Full power is applied to phase A by using the boost operation mode.

Machine winding 320 may also be powered from the energy stored in capacitor 306 using the buck circuit comprising capacitor 306, transistor 308, machine winding 320, and battery bank 316. The operation of powering machine winding 320 is similar to the operation of charging battery bank 316, described above. Therefore, machine winding 320 can be powered in the motoring mode either from the energy stored in capacitor 306 or that stored in battery bank 316.

The energy transferred from machine winding 322 to capacitor 306 may be used to energize machine winding 320. Thus, capacitor 306 receives energy from a boost circuit comprising battery bank 316, capacitor 318, machine winding 322, transistor 312, diode 314, and capacitor 306.

Advantages of power converter 300 include the following. Both machine windings 320 and 322 are powered from battery bank 316 to work at a desired output. A front-end buck power circuit charges battery bank 316 using energy received from a power-grid input and stored in capacitor 306. Capacitor 306 supplies energy to machine winding 320 during its motoring operation using the charge received from machine windings 320 and 322 during their current control and commutation intervals. The motoring operation of machine winding 320 is independent of the capacitive charge stored by capacitor 306. The commutation of current in machine winding 322 is unhindered by the motoring operation of machine winding 320.

Transistor 324 and freewheeling diode 310 may be integrated within a single device package, such as an insulated-gate bipolar transistor (IGBT), or a single device, such as with a metal-oxide-semiconductor field-effect transistor (MOSFET). Transistor 308 and diode 326 may be integrated within a single device package, such as an IGBT, or a single device, such as with a MOSFET. The dense packaging of the IGBT or MOSFET supports a more compact package for power converter 300. The two IGBT/MOSFET packages may be implemented by a single leg of an inverter bridge. These arrangements greatly reduce packaging volume and weight and the cost of the power converter.

Figure 4:
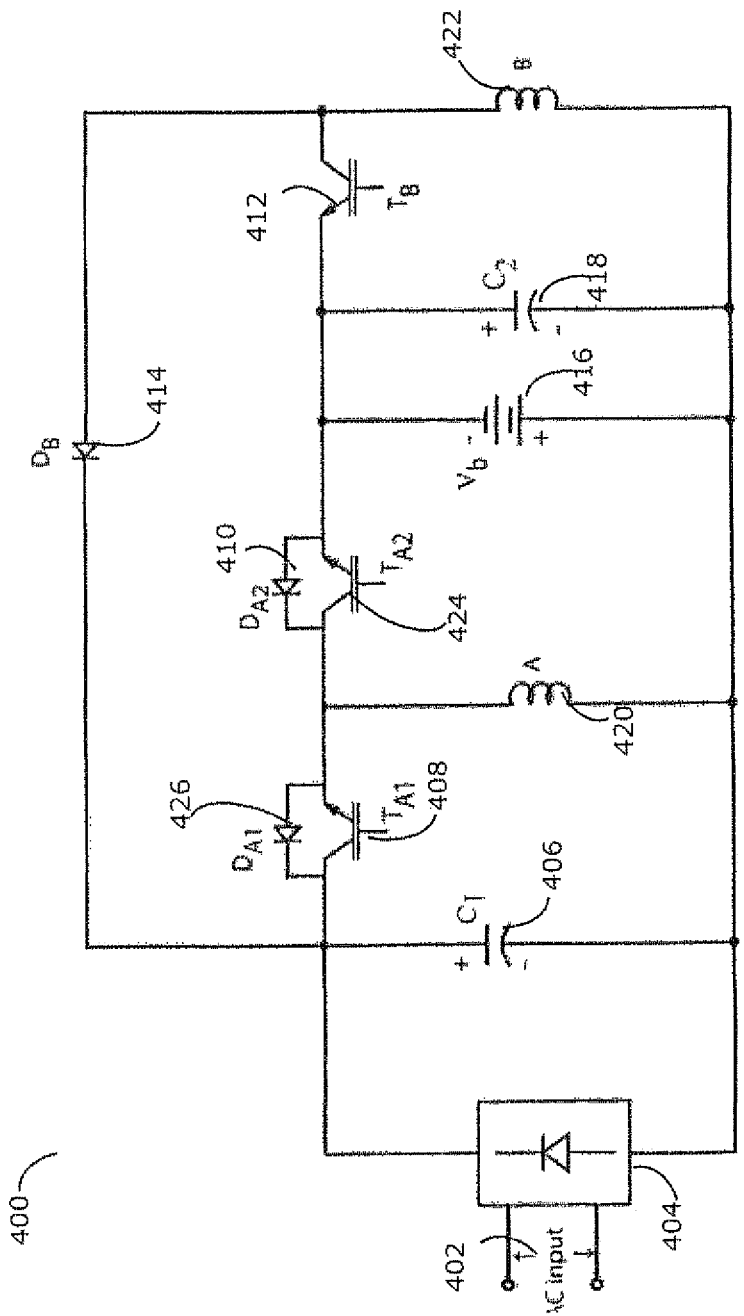
FIG. 4 illustrates a fourth embodiment of a power converter defined by the invention.

FIG. 4 illustrates a fourth embodiment of a power converter defined by the invention. A rectifier 404 rectifies an ac voltage provided by ac voltage source 402 and applies the rectified voltage across a capacitor 406. When a transistor 408 is switched on, capacitor 406 conveys a current through transistor 408 and a machine winding 420 so as to energize machine winding 420. As the current flowing through machine winding 420 reaches an established limit for charging a battery bank 416, transistor 408 is switched off so that the energy stored by machine winding 420 is discharged by the conveyance of current through machine winding 420, battery bank 416, and diode 410. When the flow of current conveyed towards battery bank 416 diminishes to an established amount, transistor 408 may be switched back on to re-energize machine winding 420 and subsequently transfer this energy to battery bank 416 upon switching off transistor 408; this is a buck-boost mode of converter operation.

While machine winding 420 is being energized, the entire voltage across capacitor 406 is applied across machine winding 420, less the voltage drop across transistor 408 and any parasitic voltage loss. Similarly, the entire voltage across machine winding 420 as it de-energizes is applied across battery bank 416, less a diode-voltage drop across diode 410 and any parasitic loss.

Energy from battery bank 416 is transferred to machine winding 420 by switching a transistor 424 on so that current is conveyed from battery bank 416 through machine winding 420 and transistor 424. Upon switching transistor 424 off, the energy stored by machine winding 420 is discharged by the conveyance of current through machine winding 420, diode 426, and capacitor 406. This discharge of energy stored in machine winding 420 provides continued motoring torque in the machine power by power converter 400 while storing excess energy in capacitor 406.

The voltage across machine winding 420 during its de-energization period is the entire dc voltage applied across capacitor 406 (i.e., the dc voltage source), less a diode-voltage drop across diode 426 and any parasitic loss. By contrast, the voltage across machine winding 320 of power converter 300 is the difference between the dc voltage source (i.e., the voltage across capacitor 306) and voltage across battery bank 316.

A transistor 412 is switched on to convey current from battery bank 416 through machine winding 422 and transistor 412. The entire battery voltage is applied across machine winding 422, less the voltage drop across transistor 412 and any parasitic loss. When transistor 412 is turned off, the energy stored by machine winding 422 is discharged by the conveyance of current through machine winding 422, a diode 414, diode 426, and capacitor 406. A capacitor 418 serves as a filter across battery bank 416.

The voltage across machine winding 422 is the same as the voltage across capacitor 406 (i.e., the dc voltage source), less a diode-voltage drop and any parasitic loss. By contrast, the voltage across machine winding 322 of power converter 300 during the de-energization of machine winding 322 is approximately the difference between the dc voltage source and battery bank voltage.

The same advantages available during motoring operation of power converter 400 are similarly available during the regeneration mode of operation, for both machine windings 420 and 422. Moreover, power converter 400, as with power converter 300, requires only three transistors and three diodes; thereby supporting compact packaging and low cost.

Although power converters 300 and 400 have been described in connection with a two-phase motor drive system, the principles of these power converters are extendable to three or more phase machines. For example, machine winding 322 and diode 314 constitute a portion of a boost circuit within power converter 300; a similar boost-circuit portion that comprises a machine winding and diode may be connected in parallel with machine winding 322 and diode 314 for each phase of the machine in excess of two. Similarly, machine winding 422 and diode 414 constitute a portion of a boost circuit within power converter 400; a similar boost-circuit portion that comprises a machine winding and diode may be connected in parallel with machine winding 422 and diode 414 for each phase of the machine in excess of two.

Figure 5:
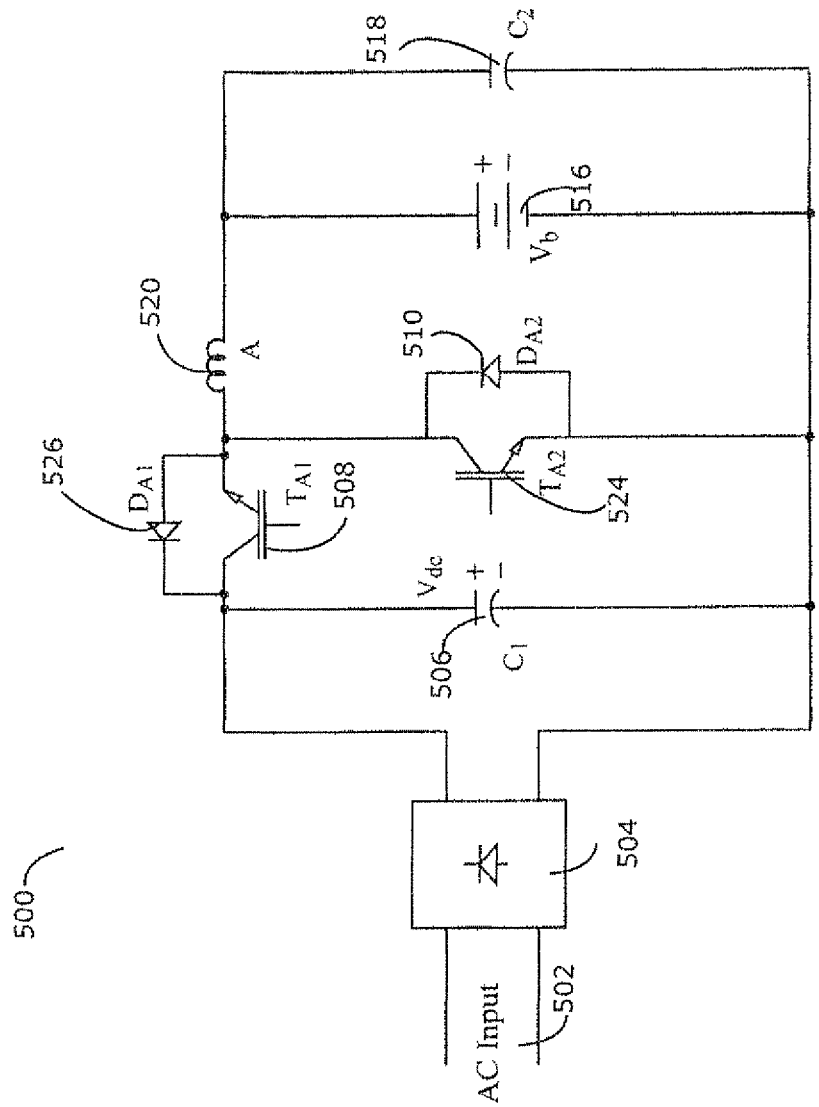
FIG. 5 illustrates a fifth embodiment of a power converter defined by the invention.

FIG. 5 illustrates a fifth embodiment of a power converter defined by the invention. Rectifier 504 rectifies an ac voltage provided by ac voltage source 502. The rectified voltage is applied across capacitor 506. When transistor 508 is switched on, capacitor 506 conveys current through transistor 508, machine winding 520, and battery bank 516. Transistor 508, machine winding 520, and a freewheeling diode constitute part of a buck converter circuit. When transistor 508 is switched off, machine winding 520 discharges its stored energy by conducting a current through battery bank 516 and a diode 510.

When an energization phase of machine winding 520 is in a positive half-cycle (i.e., its induced electromotive force (emf) is in opposition to voltage $V_b$ across battery bank 516), a transistor 524 regulates the current in machine winding 520. When transistor 524 is turned off to lower the current in machine winding 520 or to extinguish the current, machine winding 520 discharges its stored energy by conveying a current through machine winding 520, diode 526, capacitor 506, and, a capacitor 518.

When the induced emf of the phase of machine winding 520 is in an additive state, the machine is ready for negative current operation. Switching on transistor 508 causes capacitor 506 to convey current through transistor 508, machine winding 520, and battery bank 516.

Injecting positive current when induced emf is negative, and vice versa, enables regenerative braking in a PMBDC motor. When an induced emf of a phase of machine winding 520 is positive (i.e., its polarity is in opposition to $V_b$), transistor 508 is switched on so that a negative current (flowing from left to right in the illustration of machine winding 520) flows through machine winding 520 so as to transfer energy from the machine to battery bank 516. Likewise, when induced emf is negative (i.e., when it is additive to $V_b$), transistor 524 is switched on to convey positive current (i.e., current flowing from right to left in the illustrated machine winding 520). In each instance, regenerative braking slows the speed of the machine.

When current is positive, the induced emf plus $V_b$ act so as to build up current when transistor 524 is turned off such that the sum of induced emf and $V_b$ drives a current into machine winding 520 for transferring energy to capacitor 506. When current in machine winding 520 is negative, the induced emf has to be positive; that means induced emf opposes $V_b$, with the result that sum of $V_{dc}$ and induced emf helps to build up the current when transistor 508 is turned on. When transistor 508 is turned off, to regulate the current, the induced emf assists the energy transfer from machine winding 520 to battery bank 516.

Advantages of power converter 500 are the following. No external inductor is required for a battery charging operation of power converter 500. Only two transistors and two diodes are required for both battery charging and motoring (and regenerative) operation, and the four devices (i.e., two transistors and two diodes) can be acquired in one package as one phase leg of an inverter package or as two devices that each comprises a transistor and diode in one package; these packages offer low-cost realizations, high-density, and low volume. All the devices and machine winding are used for both battery charging and for running the motor in all its modes; therefore, maximum utilization of the power converter and machine leads to compact packaging, minimum components, high efficiency, and low cost. High efficiency is achieved because only one device (i.e., transistor/diode) is in service with machine winding 520 at any time (in contrast to two in conventional motor drives); this results in low device-conduction loss and high converter- and system-efficiency. The small number of devices reduces the required heat-sink size, printed circuit board space, and number of logic power supplies, gate drives, and control electronics. All of these result in packaging compactness, material and components saving, and low cost.

Figure 6:
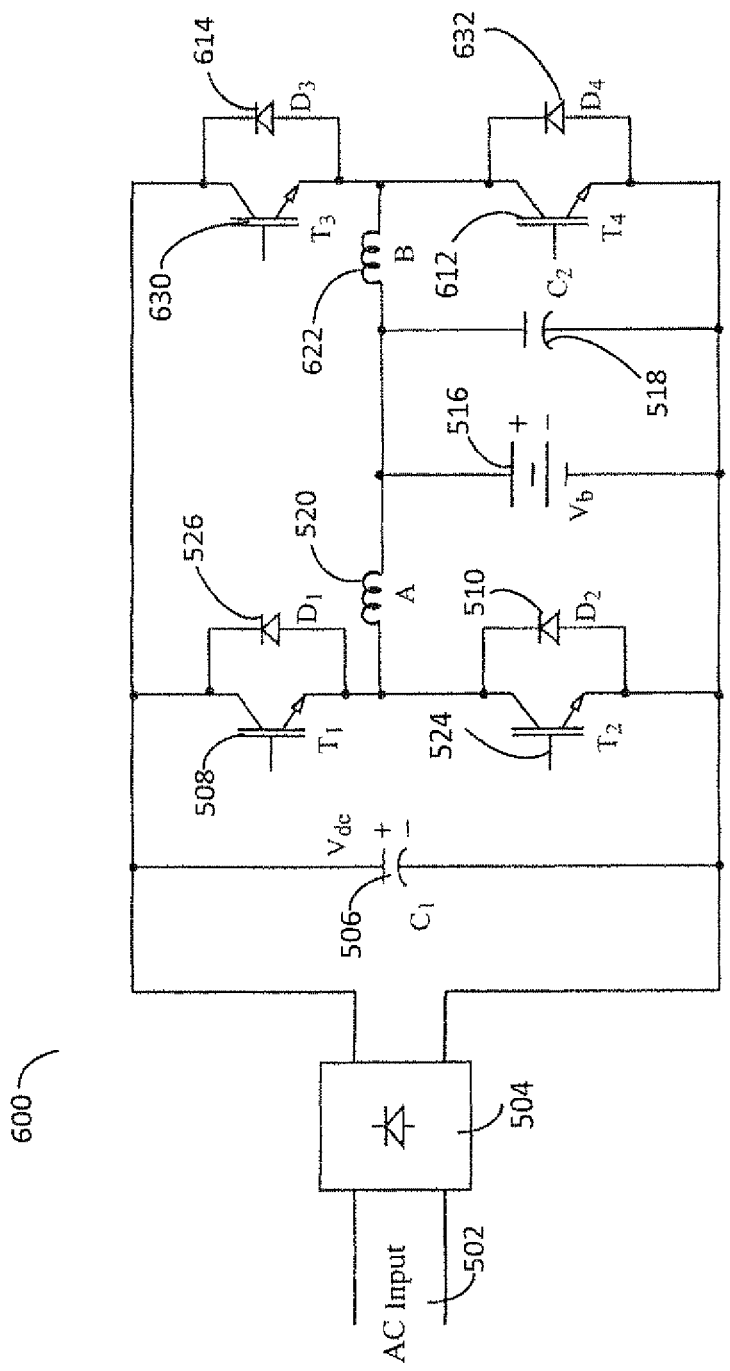
FIG. 6 illustrates a sixth embodiment of a power converter defined by the invention.

FIG. 6 illustrates a sixth embodiment of a power converter defined by the invention. Power converter 600 is derived from power converter 500 by adding another machine winding and an inverter phase leg for a second motor phase. More specifically, the additional components of power converter 600 are a phase-B machine winding 622 and transistors 612 and 630 having anti-parallel diodes 632 and 614, respectively across them. Transistors 612 and 630 and diodes 632 and 614 constitute an inverter phase leg, similar to transistors 508 and 524 and diodes 510 and 526. Together, these two sets of phase legs of an inverter constitute a single-phase H-bridge inverter, which is available in the form of an intelligent power module with gate drivers and protection circuits for over-current, under-voltage, and over-voltage operation; they are compact in size and very cost effective for mass production.

Transistor 508, machine winding 520, battery bank 516, capacitor 506, and diode 510 are used as a buck power circuit for charging the battery from the do source voltage $V_{dc}$. Similarly transistor 630, machine winding 622, battery bank 516, capacitor 506, and diode 632 serve as another buck power converter circuit to charge battery bank 516 from capacitor 506. Both avenues for battery charging through machine winding 520 and machine winding 622 present an opportunity for fast charging.

Positive currents in machine windings 520 and 622 are injected and controlled by transistor 524 and transistor 612, respectively. Similarly negative currents in machine windings 520 and 622 are controlled by transistor 508 and transistor 630, respectively.

Advantages provided by power converter 600 include the following. No external inductor is required for filtering because the machine phases are utilized for this purpose during battery charging from the grid. Both positive and negative currents can be injected into the machine phases, thus increasing the torque of the machine. Full regenerative braking is achieved. Full utilization of electronic devices and machine are achieved. The use of a single-phase inverter bridge provides compact packaging of the power circuit, resulting in low cost and high reliability. Power converter 600 provides a low-cost solution for the control of a battery operated two-phase PMBDC motor drive having high torque output. Two sets of phase legs of an inverter constitute a single-phase H-bridge inverter, which is usually available in the form of an intelligent power module with gate drivers and protection circuits for over-current; under-voltage, and over-voltage operation.

Other embodiments may be derived from embodiments 1 to 6. Consider a single-phase motor drive, similar to that of embodiment 5, that can be derived from embodiment 4. Removing machine winding 422 and its associated transistor 412 and freewheeling diode 414 provides a single-phase motor drive with full capabilities of charging battery bank 416 from capacitor 406, via transistor 408, machine winding 420, and freewheeling diode 410. Similarly, the same charging path is used for the motoring operation of machine winding 420, from the energy stored in capacitor 406. The energy from battery bank 416 is applied for the motoring operation of machine winding 420, using transistor 424 to initiate a current; when transistor 424 terminates the current, the energy stored by machine winding 420 is discharged by a current routed through freewheeling diode 426 to capacitor 406. Regeneration within this embodiment is similar to that described with respect to that with embodiment 4. Two such units of a single-phase motor drive will provide a two-phase motor drive with independent capability for battery charging, motoring, and regeneration, similar to embodiment 6. Many embodiments of the invention are derivable from the various embodiments presented herein, by those knowledgeable in this field.

All the embodiments presented herein are equally applicable to both switched reluctance machines and permanent magnet brushless dc machines (PMBDCMs). Apart from their applications in electric vehicle motor drives, these embodiments are also applicable to hand tool and appliance motor drives.

Embodiments of the disclosed power converter include: (1) a two-phase SRM or PMBDCM drive system with two transistors and two diodes interconnected so as to provide charging of a battery bank, motive power, and regeneration with no external inductors; (2) a two-phase SRM or PMBDCM drive system with two transistors and two diodes interconnected so as to provide charging of a battery bank, motive power, and regeneration while using only one transistor or one diode per phase winding; (3) the embodiments of items (1) and (2) extended to more than two phases without changing their operational features; (4) a two-phase SRM or PMBDCM drive system with three transistors and three diodes interconnected so as to provide charging of a battery bank, motive power, and regeneration with two phase windings capable of drawing motive power from the battery to the fullest extent (i.e., the applied voltage to the phase windings during torque generation is the entire battery voltage, neglecting a transistor voltage drop; (5) a two-phase SRM or PMBDCM drive system with three transistors and three diodes interconnected so as to provide charging of a battery bank, motive power, and regeneration, such that two phase windings are capable of drawing motive power from the battery to the fullest extent (i.e., the applied voltage to the phase windings during torque generation is the entire battery voltage, neglecting a transistor voltage drop, and during charging the entire dc voltage bus is applied to a first phase); (6) a single-phase SRM or PMBDCM motor drive circuit with only two transistors and two diodes interconnected so as to provide charging of a battery bank, motive power, and regeneration, such that two phase windings are capable of drawing motive power from the battery to the fullest extent (i.e., the applied voltage to the phase windings during torque generation is the entire battery voltage, neglecting a transistor voltage drop); (7) a single-phase SRM or PMBDCM motor drive circuit with only two transistors and two diodes interconnected so as to provide charging of a battery bank, motive power, and regeneration, such that two phase windings are capable of drawing motive power from the battery to the fullest extent (i.e., the applied voltage to the phase windings during torque generation is the entire battery voltage, neglecting a transistor voltage drop, and during charging the entire dc voltage bus is applied to a first phase); (8) two single-phase motor drive embodiments interconnected in one circuit so as to create a two-phase motor drive circuit that provides charging of a battery bank, motive power, and regeneration while two phase windings are capable of drawing motive power from the battery to the fullest extent (i.e., the applied voltage to the phase windings during torque generation is the entire battery voltage, neglecting a transistor voltage drop, and during charging the entire dc voltage bus is applied to a first phase); (9) a power converter that is capable of applying an entire battery voltage or dc voltage source to machine phases with only one device in series with the machine phases; (10) a single-phase full bridge inverter interconnected so as to power, charge and regenerate a two-phase machine and a battery bank, which can be charged from the utility grid with a rectifier in the front end, for making a dc source voltage; (11) a power converter that is capable of charging a battery using two phase windings; and (12) a power converter that is capable of injecting both positive and negative currents in machines phases of a two-phase machine.

The foregoing has been a detailed description of possible embodiments of the invention. Other embodiments of the invention will be apparent to those skilled in the art from consideration of the specification and practice of the invention. Accordingly, it is intended that this specification and its disclosed embodiments be considered as exemplary only, with the true scope and spirit of the invention being indicated by the following claims.

What is claimed is:

1. A power converter comprising:
   a first switch; and
   a first unidirectional current device that conducts current unidirectionally, wherein:
   the first switch and first unidirectional current device are interconnected such that when interconnected with a direct current (dc) voltage supply, battery, and first phase winding of an electrical machine:
      a first operational state exists in which a conductive state of the first switch causes the dc voltage supply to conduct current through the first switch, first phase winding and battery, so as to store energy within the first phase winding and battery, and
      a second operational state exists in which a non-conductive state of the first switch causes the first phase winding to discharge its stored energy by conducting current through the first unidirectional current device and battery, so as to store energy in the battery;
      wherein the power converter is configured to regulate a current in the first phase winding to be substantially equal to a desired charging current of the battery.

2. The power converter of claim 1, further comprising:
   a second switch; and
   a second unidirectional current device that conducts current unidirectionally, wherein:
   the first and second switches and first and second unidirectional current devices are interconnected such that when interconnected with the dc voltage supply, the battery, the first phase winding, and a second phase winding of the electrical machine:
      a third operational state exists in which a conductive state of the second switch causes the battery to conduct current through the second phase winding, so as to store energy within the second phase winding, and
      a fourth operational state exists in which a non-conductive state of the second switch causes the second phase winding to discharge its stored energy by conducting current through the second unidirectional current device and dc voltage supply, so as to store energy in the dc voltage supply.

3. The power converter of claim 1, wherein the energization of the first phase winding provides: (1) motoring torque to the electrical machine for a first alignment of rotor and stator poles of the electrical machine, (2) regenerative torque to the electrical machine for an unalignment of the rotor and stator poles, and (3) an inductance-filtered supply voltage that charges the battery, providing significant motoring or regenerative torque, for a second alignment of the rotor and stator poles.

4. The power converter of claim 2, further comprising:
   a third switch; and
   a third unidirectional current device that conducts current unidirectionally, wherein:
   the first through third switches and first through third unidirectional current devices are interconnected such that when interconnected with the dc voltage supply, the battery, the first and second phase windings of the electrical machine, and a third phase winding of the electrical machine:
      a fifth operational state exists in which a conductive state of the third switch causes the battery to conduct current through the third phase winding, so as to store energy within the third phase winding, and
      a sixth operational state exists in which a non-conductive state of the third switch causes the second phase winding to discharge its stored energy by conducting current through the third unidirectional current device and dc voltage supply, so as to store energy in the dc voltage supply.

5. An electrical machine comprising:
   the power converter of claim 4;
   a rotor having rotor poles; and
   a stator having first excitation phase poles, second excitation phase poles, and a common pole, wherein:
   the first phase winding is wound around the first excitation phase poles,
   the second phase winding is wound around the second excitation phase poles,
   the third phase winding is wound around the common pole, and
   the common pole receives flux conveyed by each of the first excitation phase poles through the rotor poles and receives flux conveyed by each of the second excitation phase poles through the rotor poles.

6. An electrical machine comprising:
   the power converter of claim 4;
   a rotor having rotor poles; and
   a stator having first excitation phase poles, second excitation phase poles, and a stator back arm interconnecting the first and second excitation phase poles, wherein:
   the first phase winding is wound around the first excitation phase poles,
   the second phase winding is wound around the second excitation phase poles, and
   the third phase winding is wound around the stator back arm.

7. The power converter of claim 2, further comprising:
   a third switch; and a third unidirectional current device that conducts current unidirectionally, wherein:

the first through third switches, and first through third unidirectional current devices are interconnected such that when interconnected with the dc voltage supply, the battery, the first phase winding, and a second phase winding of the electrical machine:

a fifth operational state exists in which a conductive state of the third switch causes the battery to conduct current through the first phase winding, so as to store energy within the first phase winding, and a sixth operational state exists in which a non-conductive state of the third switch causes the first phase winding to discharge its stored energy by conducting current through the third unidirectional current device and dc voltage supply, so as to store energy in the dc voltage supply.

8. The power converter of claim 7, wherein the current conducted through the first phase winding during the first and second operational states flows in a direction opposite to that during the fifth and sixth operational states.

9. The power converter of claim 1, further comprising:
a second switch; and
a second unidirectional current device that conducts current unidirectionally, wherein:

the first and second switches and first and second unidirectional current devices are interconnected such that when interconnected with the dc voltage supply, battery, and first phase winding:

a third operational state exists in which a conductive state of the second switch causes the battery to conduct current through the first phase winding, so as to store energy within the second phase winding, and a fourth operational state exists in which a non-conductive state of the second switch causes the second phase winding to discharge its stored energy by conducting current through the second unidirectional current device and dc voltage supply, so as to store energy in the dc voltage supply.

10. The power converter of claim 7, further comprising:
a fourth switch; and
a fourth unidirectional current device that conducts current unidirectionally, wherein:

the first through fourth switches and first through fourth unidirectional current devices are interconnected such that when interconnected with the dc voltage supply, battery, and first and second phase windings of the electrical machine:

a seventh operational state exists in which a conductive state of the fourth switch causes the dc voltage supply to conduct current through the second phase winding and battery, so as to store energy within the second phase winding and the battery, an eighth operational state exists in which a non-conductive state of the fourth switch causes the second phase winding to discharge its stored energy by conducting current through the battery and fourth unidirectional current device, so as to store energy in the battery.

11. The power converter of claim 10, wherein the current conducted through the second phase winding during the third and fourth operational states flows in a direction opposite to that during the seventh and eighth operational states.

12. A power converter comprising:
a first capacitor having first and second electrical terminals;

a first switch that conducts current unidirectionally between first and second electrical terminals when the first switch is activated and does not conduct current between the first and second terminals when deactivated;

a first unidirectional current device that conducts current unidirectionally between first and second electrical terminals;

a first phase winding of an electrical machine; and a battery having first and second electrical terminals, wherein:

the first terminal of the first capacitor is directly connected to the first terminal of the first switch, the second terminal of the first switch is directly connected to the second terminal of the first unidirectional current device and the first terminal of the first phase winding, the second terminal of the first phase winding is directly connected to the first terminal of the battery, and the second terminal of the first capacitor is directly connected to the first terminal of the first unidirectional device and the second terminal of the battery;

wherein the power converter is configured to regulate a current in the first phase winding to be substantially equal to a desired charging current of the battery.

13. The power converter of claim 12, further comprising:
a second capacitor having first and second electrical terminals;

an $N^{th}$ switch that conducts current unidirectionally between first and second electrical terminals when the $N^{th}$ switch is activated and does not conduct current between the first and second terminals when deactivated;

an $N^{th}$ unidirectional current device that conducts current unidirectionally between first and second electrical terminals; and an $N^{th}$ phase winding of the electrical machine, wherein:

for an integer value of N that is greater than one:

the first terminal of the $N^{th}$ phase winding is directly connected to the second terminal of the first phase winding and the first terminals of the battery and second capacitor, the second terminal of the $N^{th}$ phase winding is directly connected to the first terminals of the $N^{th}$ switch and $N^{th}$ unidirectional current device, the second terminal of the $N^{th}$ unidirectional current device is directly connected to the first terminals of the first capacitor and first switch, and the second terminal of the $N^{th}$ switch is directly connected the first terminal of the first unidirectional current device and the second terminals of the first capacitor, battery, and second capacitor.

14. The power converter of claim 13, further comprising:
an $(N+1)^{th}$ switch that conducts current unidirectionally between first and second electrical terminals when the $(N+1)^{th}$ switch is activated and does not conduct current between the first and second terminals when deactivated; and an $(N+1)^{th}$ unidirectional current device that conducts current unidirectionally between first and second electrical terminals, wherein:

the first terminal of the $(N+1)^{th}$ switch is directly connected to the second terminals of the first switch and the first unidirectional current device and the first terminals of first phase winding and the $N^{th}$ unidirectional current device, the second terminal of the $(N+1)^{th}$ unidirectional current device is directly connected to the first terminals of the first capacitor and first switch and the second terminal of the $N^{th}$ unidirectional current device, and the second terminal of the $(N+1)^{th}$ switch is directly connected the first terminal of the first unidirectional current device and the second terminals of the first capacitor, battery, second capacitor, and $N^{th}$ switch.

15. The power converter of claim 12, further comprising:

a second capacitor having first and second electrical terminals;

a second switch that conducts current unidirectionally between first and second electrical terminals when the second switch is activated and does not conduct current between the first and second terminals when deactivated; and a second unidirectional current device that conducts current unidirectionally between first and second electrical terminals, wherein:

the first terminal of the second capacitor is directly connected to the first terminal of the battery and the second terminal of the first phase winding, and the first terminal of the second unidirectional current device is directly connected to the first terminal of the second switch and the second terminals of the first switch and first unidirectional current device, the second terminal of the second unidirectional device is directly connected to the first terminals of the first capacitor and first switch, and the second terminal of the second switch is directly connected to the first terminal of the first unidirectional current device and the second terminals of the first capacitor, second capacitor, and battery.

16. The power converter of claim 15, further comprising:

an $N^{th}$ switch that conducts current unidirectionally between first and second electrical terminals when the $N^{th}$ switch is activated and does not conduct current between the first and second terminals when deactivated;

an $N^{th}$ unidirectional current device that conducts current unidirectionally between first and second electrical terminals; and an $(N-1)^{th}$ phase winding of the electrical machine, wherein:

for an integer value of N that is greater than two:

the first terminal of the $(N-1)^{th}$ phase winding is directly connected to the second terminal of the first phase winding and the first terminals of the battery and second capacitor, the second terminal of the $(N-1)^{th}$ phase winding is directly connected to the first terminals of the $N^{th}$ switch and $N^{th}$ unidirectional current device, the second terminal of the $N^{th}$ unidirectional current device is directly connected to the first terminals of the first capacitor and first switch and the second terminal of the second unidirectional device, and the second terminal of the $N^{th}$ switch is directly connected the first terminal of the first unidirectional current device and the second terminals of the first capacitor, battery, second switch, and second capacitor.

17. The power converter of claim 15, further comprising:

third and fourth switches that each conducts current unidirectionally between first and second electrical terminals when the switch is activated and does not conduct current between the first and second terminals when deactivated;

third and fourth unidirectional current devices that each conducts current unidirectionally between first and second electrical terminals; and a second phase winding of the electrical machine, wherein:

the first terminal of the second phase winding is directly connected to the second terminal of the first phase winding and the first terminals of the battery and second capacitor, the second terminal of the second phase winding is directly connected to the first terminals of the fourth switch and third unidirectional current device and the second terminals of the third switch and fourth unidirectional current device, the second terminal of the third unidirectional current device is directly connected to the first terminals of the first capacitor and first and third switches and the second terminal of the second unidirectional device, and the second terminal of the fourth switch is directly connected the first terminals of the first and fourth unidirectional current devices and the second terminals of the first capacitor, battery, second switch, and second capacitor.

18. A power converter comprising:

a first capacitor having first and second electrical terminals;

first and second switches that each conducts current unidirectionally between first and second electrical terminals when the switch is activated and does not conduct current between the first and second terminals when deactivated;

first and second unidirectional current devices that each conducts current unidirectionally between first and second electrical terminals;

a first phase winding of an electrical machine; and a battery having first and second electrical terminals, wherein:

the first terminal of the first capacitor is directly connected to the first terminal of the first switch and the second terminal of the first unidirectional current device, the second terminal of the first switch is directly connected to the second terminal of the second unidirectional current device and the first terminals of the first phase winding, second switch, and first unidirectional current device, the second terminal of the second switch is directly connected to the first terminals of the second unidirectional current device and battery, and the second terminal of the first capacitor is directly connected to the second terminals of the first phase winding and the battery.

19. The power converter of claim 18, further comprising:

a second capacitor having first and second electrical terminals;

an $N^{th}$ switch that conducts current unidirectionally between first and second electrical terminals when the $N^{th}$ switch is activated and does not conduct current between the first and second terminals when deactivated;

an $N^{th}$ unidirectional current device that conducts current unidirectionally between first and second electrical terminals; and an $(N-1)^{th}$ phase winding of the electrical machine, wherein:

for an integer value of N that is greater than two:

the first terminal of the $N^{th}$ switch is directly connected to the first terminals of the $(N-1)^{th}$ phase winding and the $N^{th}$ unidirectional current device, the second terminal of the $N^{th}$ switch is directly connected to the second terminal of the second switch and the first terminals of the battery, second capacitor, and second unidirectional current device, the second terminal of the $N^{th}$ unidirectional current device is directly connected to the first terminals of the first capacitor and first switch and the second terminal of the first unidirectional current device, and the second terminal of the $(N-1)^{th}$ phase winding is directly connected to the second terminals of the first and second capacitors, battery, and first phase winding.

20. A power converter comprising:

a first switch; and a first unidirectional current device that conducts current unidirectionally, wherein:

the first switch and first unidirectional current device are interconnected such that when interconnected with a direct current (dc) voltage supply, battery, and first phase winding of an electrical machine:

a first operational state exists in which a conductive state of the first switch causes the battery to conduct current through the first switch and first phase winding, so as to store energy within the first phase winding, and a second operational state exists in which a non-conductive state of the first switch causes the first phase winding to discharge its stored energy by conducting current through the first unidirectional current device and the dc voltage supply, so as to store energy in the dc voltage supply;

wherein the power converter is configured to regulate a current in the first phase winding to be substantially equal to a desired charging current of the battery.

21. A brushless motor system comprising:

a brushless motor having first and second phase windings; and a battery, wherein:

the phase winding and battery are interconnected such that when interconnected with a direct current (dc) voltage supply, a first operational state exists in which energy stored by the first phase winding is discharged by conducting current through the battery, thereby storing energy in the battery;

wherein the brushless motor system is configured to regulate a current in the first phase winding to be substantially equal to a desired charging current of the battery.

22. The brushless motor system of claim 21, wherein a second operational state exists in which energy stored by the battery is discharged by conducting current through the second phase winding, thereby applying motoring or regenerative torque to the brushless motor.

* * * * *